United States Patent
Masera et al.

(10) Patent No.: US 10,263,795 B2
(45) Date of Patent: Apr. 16, 2019

(54) SYSTEM AND METHOD FOR REDUCING THE ENERGY CONSUMPTION OF AN INTERCONNECTION DEVICE

(71) Applicant: SAGEMCOM BROADBAND SAS, Rueil Malmaison (FR)

(72) Inventors: Eric Masera, Rueil Malmaison (FR); Nicolas Dangy-Caye, Rueil Malmaison (FR); Antonie Rocquelay, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 15/122,478

(22) PCT Filed: Mar. 4, 2015

(86) PCT No.: PCT/EP2015/054503
§ 371 (c)(1),
(2) Date: Aug. 30, 2016

(87) PCT Pub. No.: WO2015/132296
PCT Pub. Date: Sep. 11, 2015

(65) Prior Publication Data
US 2017/0070355 A1    Mar. 9, 2017

(30) Foreign Application Priority Data

Mar. 6, 2014 (FR) ...................... 14 51828

(51) Int. Cl.
*H04L 12/12* (2006.01)
*H04L 12/46* (2006.01)
(Continued)

(52) U.S. Cl.
CPC .......... *H04L 12/12* (2013.01); *H04L 12/4625* (2013.01); *H04W 52/0229* (2013.01);
(Continued)

(58) Field of Classification Search
CPC . H04L 12/12; H04L 12/4628; H04L 12/2834; H04W 52/0229; H04W 76/046; Y02B 60/32; Y02B 60/34
(Continued)

(56) References Cited

U.S. PATENT DOCUMENTS 5,966,378 A * 10/1999 Hamalainen .......... H04W 72/02
370/329
7,228,143 B1 * 6/2007 Hamalainen .......... H04W 68/00
455/458

(Continued)

OTHER PUBLICATIONS

International Search Report and Written Opinion of the ISA for PCT/EP2015/054503, dated Jun. 2, 2015, 10 pages.

*Primary Examiner* — Hai V Nguyen
(74) *Attorney, Agent, or Firm* — Nixon & Vanderhye P.C.

(57) ABSTRACT

A device for interconnecting a first communication network and a second communication network comprises a plurality of components functioning in an active mode or a standby mode. Said interconnection device performs the following steps: changing to active mode (401) the plurality of components under the control of a secondary processor, the secondary processor being a component of the interconnection device continuously in active mode and controlling changes to active mode following the change to active mode, sending (405) an interrogation request to a service-management server (110) connected to the first communication network in order to check the existence of service demands, receiving (407) a response to the interrogation request; and changing the plurality of components to standby mode (427) at an instant dependent on the response received.

12 Claims, 6 Drawing Sheets

Figure 1:
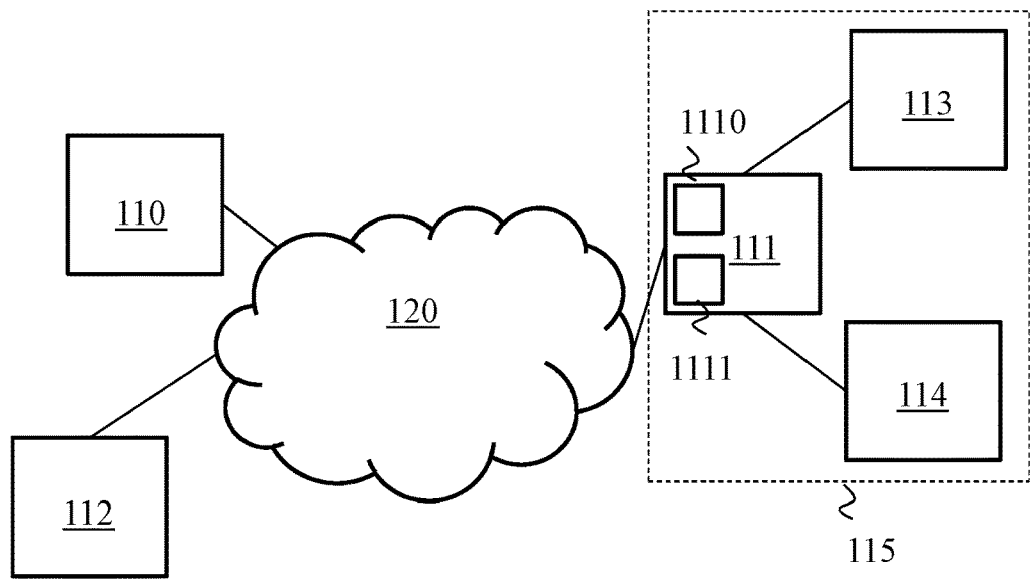

(51) Int. Cl.
*H04W 52/02* (2009.01)
*H04W 76/27* (2018.01)
*H04B 1/401* (2015.01)
*H04B 1/44* (2006.01)
*H03J 3/08* (2006.01)
*H04L 1/02* (2006.01)
*H04L 12/28* (2006.01)

(52) U.S. Cl.
CPC ......... *H04W 76/27* (2018.02); *H04L 12/2834* (2013.01); *Y02D 70/1226* (2018.01); *Y02D 70/142* (2018.01); *Y02D 70/23* (2018.01)

(58) Field of Classification Search
USPC .......................................................... 455/88
See application file for complete search history.

(56) References Cited

U.S. PATENT DOCUMENTS

| | | | | | |
|---|---|---|---|---|---|
| 7,583,985 | B2* | 9/2009 | Matson | | G06F 1/3203 455/574 |
| 7,933,295 | B2* | 4/2011 | Thi | | H04B 3/23 370/352 |
| 8,059,572 | B2* | 11/2011 | Kim | | H04W 72/005 370/252 |
| 8,077,712 | B2* | 12/2011 | Evans | | H04L 12/12 370/389 |
| 8,111,706 | B2* | 2/2012 | Otani | | G06F 1/3203 370/401 |
| 8,190,137 | B2* | 5/2012 | Levien | | H04W 4/16 455/417 |
| 8,194,576 | B2* | 6/2012 | Kholaif | | H04W 52/0216 370/310 |
| 8,208,486 | B2* | 6/2012 | Park | | H04L 12/12 370/463 |
| 8,509,954 | B2* | 8/2013 | Imes | | F24F 11/63 700/286 |
| 8,547,983 | B2* | 10/2013 | Diab | | H04L 12/12 370/401 |
| 8,755,394 | B2* | 6/2014 | Kaluskar | | H04L 12/2818 370/235 |
| 8,769,140 | B2* | 7/2014 | Chen | | H04L 12/2812 709/225 |
| 8,787,395 | B2* | 7/2014 | Dangy-Caye | | H04L 12/12 370/401 |
| 9,088,422 | B2* | 7/2015 | Diab | | H04L 12/12 |
| 9,125,213 | B2* | 9/2015 | Xu | | H04W 76/36 |
| 9,325,859 | B2* | 4/2016 | Dangy-Caye | | H04M 3/30 |
| 2006/0116127 | A1* | 6/2006 | Wilhoite | | H04M 3/42246 455/442 |
| 2007/0275715 | A1* | 11/2007 | Lee | | H04L 12/2814 455/427 |
| 2008/0120423 | A1 | 5/2008 | Hall et al. | | |
| 2009/0029688 | A1* | 1/2009 | Levien | | H04W 4/16 455/417 |
| 2009/0147696 | A1* | 6/2009 | Park | | H04L 12/12 370/252 |
| 2009/0310607 | A1* | 12/2009 | Evans | | H04L 12/12 370/389 |
| 2010/0332212 | A1* | 12/2010 | Finkelman | | G06F 1/3203 703/23 |
| 2011/0277001 | A1* | 11/2011 | Kaluskar | | H04L 12/2818 725/80 |
| 2011/0299412 | A1* | 12/2011 | Diab | | H04L 12/12 370/252 |
| 2011/0299549 | A1* | 12/2011 | Diab | | H04L 12/12 370/401 |
| 2011/0302309 | A1* | 12/2011 | Chen | | H04L 12/2812 709/225 |
| 2013/0076523 | A1* | 3/2013 | Kwan | | A61B 5/0022 340/686.6 |
| 2013/0194065 | A1* | 8/2013 | Pellarin | | H04L 12/12 340/5.8 |
| 2013/0272268 | A1* | 10/2013 | Xu | | H04W 76/36 370/331 |
| 2013/0301637 | A1* | 11/2013 | Monsieux | | H04L 65/1036 370/352 |
| 2013/0308527 | A1* | 11/2013 | Chin | | H04W 36/0022 370/328 |
| 2013/0345885 | A1* | 12/2013 | Diab | | H04L 12/12 700/286 |
| 2014/0149758 | A1* | 5/2014 | Rajkotia | | H04L 12/12 713/310 |
| 2014/0201321 | A1* | 7/2014 | Donaghey | | H04L 67/2823 709/217 |
| 2014/0355753 | A1* | 12/2014 | Dangy-Caye | | H04M 3/30 379/413 |
| 2014/0379886 | A1* | 12/2014 | Chen | | H04L 12/2812 709/223 |
| 2015/0156715 | A1* | 6/2015 | Jeanne | | H04W 52/0206 370/311 |
| 2015/0244816 | A1* | 8/2015 | Pagani | | H04W 52/0225 370/329 |
| 2016/0142898 | A1* | 5/2016 | Poitau | | H04W 76/14 370/329 |
| 2016/0174150 | A1* | 6/2016 | Comsa | | H04W 52/0206 370/311 |
| 2016/0344604 | A1* | 11/2016 | Raleigh | | H04L 43/0876 |

* cited by examiner

SYSTEM AND METHOD FOR REDUCING THE ENERGY CONSUMPTION OF AN INTERCONNECTION DEVICE

This application is the U.S. national phase of International Application No. PCT/EP2015/054503 filed 4 Mar. 2015 which designated the U.S. and claims priority to FR Patent Application No. 14/51828 filed 6 Mar. 2014, the entire contents of each of which are hereby incorporated by reference.

The present invention relates to a method and system using a device for interconnecting first and second communication networks, such as a residential gateway, and making it possible to reduce the energy consumption of the interconnection device.

A network interconnection device is an apparatus for connecting a plurality of communication networks with each other. Appliances connected to two different networks can then communicate with each other. When the interconnection device is a residential gateway, it enables a subscriber to receive at his home, via a first network such as the Internet, services of the Internet browsing, television or VoIP (voice over Internet protocol) type. A residential gateway also enables a subscriber in a situation of mobility outside his home to access, via the Internet, contents stored or services used either directly on said residential gateway or on equipment connected to a second network such as a LAN (local area network).

To allow access to these services at any time, it is customary to keep the residential gateway or more generally the interconnection device continuously in active mode (i.e. to keep it switched on). This custom has the major defect of causing excessive consumption of energy, which is not necessarily justified by the actual requirements for access to the services delivered by the residential gateway. In order to save on energy, the subscriber can manually switch off the residential gateway, which obliges him to restart (i.e. switch on) the residential gateway in the event of a service being required. Restarting the residential gateway appears to be envisageable for certain services such as Internet browsing, provided that the residential gateway is within reach of the user. However, other services have proved to be greatly degraded or even incompatible with this simple manual restart method. For example, a user who is mobile and is therefore unable to physically access the residential gateway no longer has access to any service requiring the use of the residential gateway. This concerns for example applications involving remote programming of a video recording on a PVR (personal video recorder) connected to the second network. A service implementation demand requiring the use of the residential gateway therefore risks never succeeding if said demand is made at a time when the residential gateway is switched off.

The problem solved by the present invention consists of reducing the energy consumption of a device interconnecting a first and second network while ensuring the success of any demands for implementation of a service requiring the use of said interconnection device.

To this end, according to a first aspect of the present invention, the present invention relates to a method used by a device for interconnecting a first communication network and a second communication network, making it possible to reduce the energy consumption of said interconnection device while allowing the success of service implementation demands requiring the use of the interconnection device, said interconnection device comprising a plurality of components functioning in accordance with an active mode or a standby mode. Said interconnection device performs the following steps: changing to active mode the plurality of components under the control of a secondary processor, the secondary processor being a component of the interconnection device continuously in active mode and controlling changes to active mode of the plurality of components at given instants, the change to standby mode being controlled by the interconnection device following the end of implementation of service; following the change of the plurality of components to active mode, sending an interrogation request to a service-management server connected to the first communication network in order to check the existence of service demands; receiving a response to the interrogation request; and changing the plurality of components to standby mode by means of the secondary processor at an instant dependent on the response received.

The advantage of this method is that the times taken for changing the plurality of components of the interconnection device to active mode depend on the service implementation demands made, which significantly reduces the energy consumption. For example, the plurality of components of the interconnection device spend little time in active mode if no service implementation demand has been made. In addition, the use of a service-management server ensures that the service implementation demands can be taken into account by the interconnection device, even if the interconnection device is in standby mode at the time when the service implementation demands are made. Moreover, the changes to active mode at given instants make it possible to ensure that the waiting time for implementation of a service will not be too lengthy. Moreover, the use of a secondary processor for controlling the instants when the plurality of components change to active mode avoids a user having to manipulate the interconnection device in order to put the interconnection device into active mode. The change to a standby mode is, preferably, managed by the main processor. In an alternative embodiment, the putting into standby mode could also be managed by the secondary processor.

According to one embodiment, the secondary processor controls the given instants when the plurality of components go into active mode by using a control parameter.

According to another embodiment, the secondary processor is responsible for reawakening the main processor, which itself will be responsible for the change of the plurality of components to active mode.

The use of a control parameter simplifies the control of the given instants when the interconnection device goes into active mode.

According to one embodiment, a main processor included in the plurality of components modifies the control parameter of the secondary processor making it possible to control the given instants when the plurality of components go into active mode.

The modification of the control parameter of the secondary processor by a main processor facilitates the remote modification of said control parameter.

According to one embodiment, when said response contains information representing a demand for implementation of a service, the interconnection device uses a service dependent on a service demanded in the service implementation demand.

In this way a service that was formulated when the interconnection device was in standby mode can be taken into account by the interconnection device.

According to one embodiment, the service demanded in the service implementation demand is intended to be implemented by an item of equipment connected to the second network, the service dependent on the service demanded in the service implementation demand being a service for access to the second network.

In this way, the communications between the first and second network will be assured during the implementation of the service demanded.

According to one embodiment, the service implementation demand is first received by the service-management server from a remote item of equipment connected to the first communication network.

The method therefore enables a user who is mobile to make a service implementation demand at any time with remote equipment, even if the gateway is in standby mode.

According to one embodiment, information on modification of the control parameter of the secondary processor enabling the secondary processor to determine the instants when the plurality of components go into active mode is obtained by the interconnection device following the change of the plurality of components to active mode.

Use of the information on modification of the control parameter of the secondary processor makes it possible to adapt the instants of going into active mode according to the service implementation requirements.

According to one embodiment, said response contains the modification information.

In this way, the adaptation of the instants of going into active mode according to the service implementation requirements can be controlled remotely by the service-management server, which has precise knowledge of the services requested.

According to one embodiment, the modification information is obtained from information coming from a user.

In this way, the adaptation of the instants of going into active mode according to the service implementation requirements can be controlled by a user who knows his actual requirements.

According to one embodiment, the control parameter represents a period when the plurality of components go into active mode.

In this way, the changes to active mode will follow a regular cycle corresponding to the period of going into active mode.

According to a second aspect of the present invention, the present invention relates to a method used by a service-management server connected to a first communication network, making it possible to reduce the energy consumption of a device interconnecting the first network and a second communication network, while allowing the success of service implementation demands requiring the use of said interconnection device. In the event of reception by the service-management server of an interrogation request coming from the interconnection device, the service-management server performs the following steps: checking the presence of a service implementation demand in a list of service implementation demands; and, if a service implementation demand is present, sending a response to the interconnection device containing information representing the service implementation demand received, said interrogation requests having been sent at given instants corresponding to changes of the interconnection device to active mode controlled by a secondary processor of the interconnection device.

The use of a service-management server ensures that the service management requests can be taken into account by the interconnection device even if the interconnection device is in standby mode at the moment when the service implementation demands are made.

According to one embodiment, the service-management server interprets each service implementation demand in order to determine a representative parameter for the service implementation demand and the representative parameter determined is saved in the list of service implementation demands.

In this way, the device using the service does not have to interpret the service implementation demand and can directly use the parameters resulting from the interpretation by the server.

According to one embodiment, in the case of reception of a service implementation demand from a remote item of equipment connected to the first network, the service-management server determines whether the interconnection device is in an active mode or in a standby mode and, if the interconnection device is in an active mode, the service-management server enables the remote equipment to contact the interconnection device directly.

By enabling remote equipment to contact the interconnection device directly, the server reduces its involvement in the use of a service, which simplifies the tasks that it has to perform.

According to one embodiment, in the case of reception of an interrogation request coming from the interconnection device, the service-management server obtains modification information intended to modify a control parameter of the secondary processor of the interconnection device making it possible to control the instants when the interconnection device goes into active mode, and sends a response to the interconnection device containing the modification information with a view to modifying said control parameter.

In this way, the service-management server can remotely control the changes of the gateway to active mode.

According to a third aspect of the present invention, the present invention relates to a method used by a remote item of equipment connected to a first communication network, making it possible to reduce the energy consumption of a device interconnecting the first communication network and a second communication network, while allowing the success of service implementation demands requiring the use of the interconnection device. In the case of failure of a service implementation demand made by the remote equipment to the interconnection device, the remote equipment performs the following steps: sending said service implementation demand to a service-management server, and using the service after reception of a notification coming from the service-management server indicating that the interconnection device has gone into active mode, the service-management server having been advised of said change by the reception of an interrogation request from the interconnection device, the interrogation requests being sent at given instants corresponding to times when the interconnection device goes into active mode as controlled by a secondary processor of the interconnection device.

The sending of a service implementation demand to a service-management server in the event of failure of said service implementation demand to the interconnection device ensures that this service implementation demand will be taken into account by the interconnection device.

According to a fourth aspect of the present invention, the present invention relates to a system for reducing the energy consumption of a device interconnecting a first network and a second communication network, while ensuring the success of service implementation demands requiring the use of said interconnection device. The system comprises a device for interconnecting a first communication network and a second communication network, the interconnection system being suitable for providing services, and a remote item of equipment connected to the first communication network able to make service implementation demands, the interconnection device comprising a plurality of components functioning in an active mode or a standby mode. The system comprises: a service-management server intended to be connected to the first communication network and able to receive service demands from the remote item of equipment and to transmit these service demands to the interconnection device in the case of reception of an interrogation request coming from the interconnection device indicating a change to active mode; and the interconnection device comprises: a secondary processor, continuously in active mode, controlling the changes of the plurality of components to active mode at given instants; means for sending, following a change of the plurality of components to active mode, an interrogation request to the service-management server; means for receiving a response to the interrogation requests; and means for determining an instant of changing to standby mode according to the response received.

This system has the same advantages as those mentioned with regard to the previous aspects.

According to a fifth aspect of the present invention, the present invention relates to a device of the type for interconnecting a first network and a second network, comprising a plurality of components functioning in an active mode or a standby mode, characterised in that the device comprises:
  a secondary processor, continuously in active mode, controlling the changes of the plurality of components to active mode at given instants,
  means for sending, following a change of the plurality of components to active mode, an interrogation request to a service-management server,
  means for receiving a response to the interrogation request, and
  means for determining an instant of changing to standby mode according to the response received.

The device has the same advantages as those mentioned with regard to the first aspect.

The invention also relates to a computer program, which can be stored on a medium and/or downloaded from a communication network, in order to be read by a processor. This computer program comprises instructions for implementing any of the methods mentioned above when said program is executed by the processor. The invention also concerns storage means comprising such a computer program.

Figure 2A:
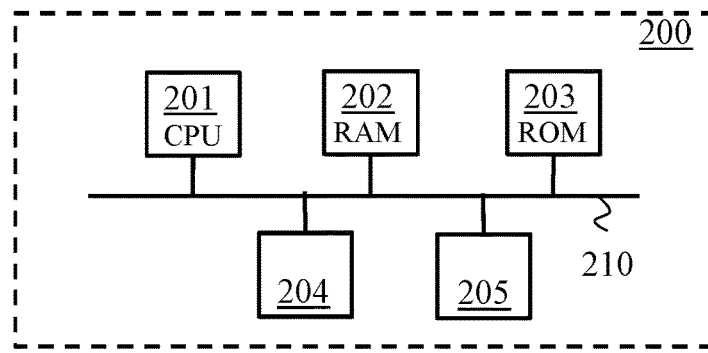
Figure 2B:
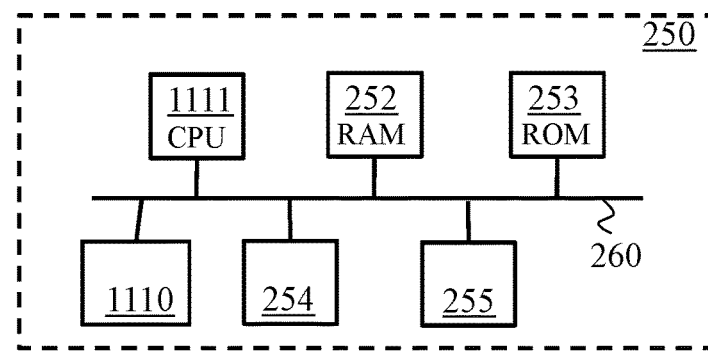
Figure 3:
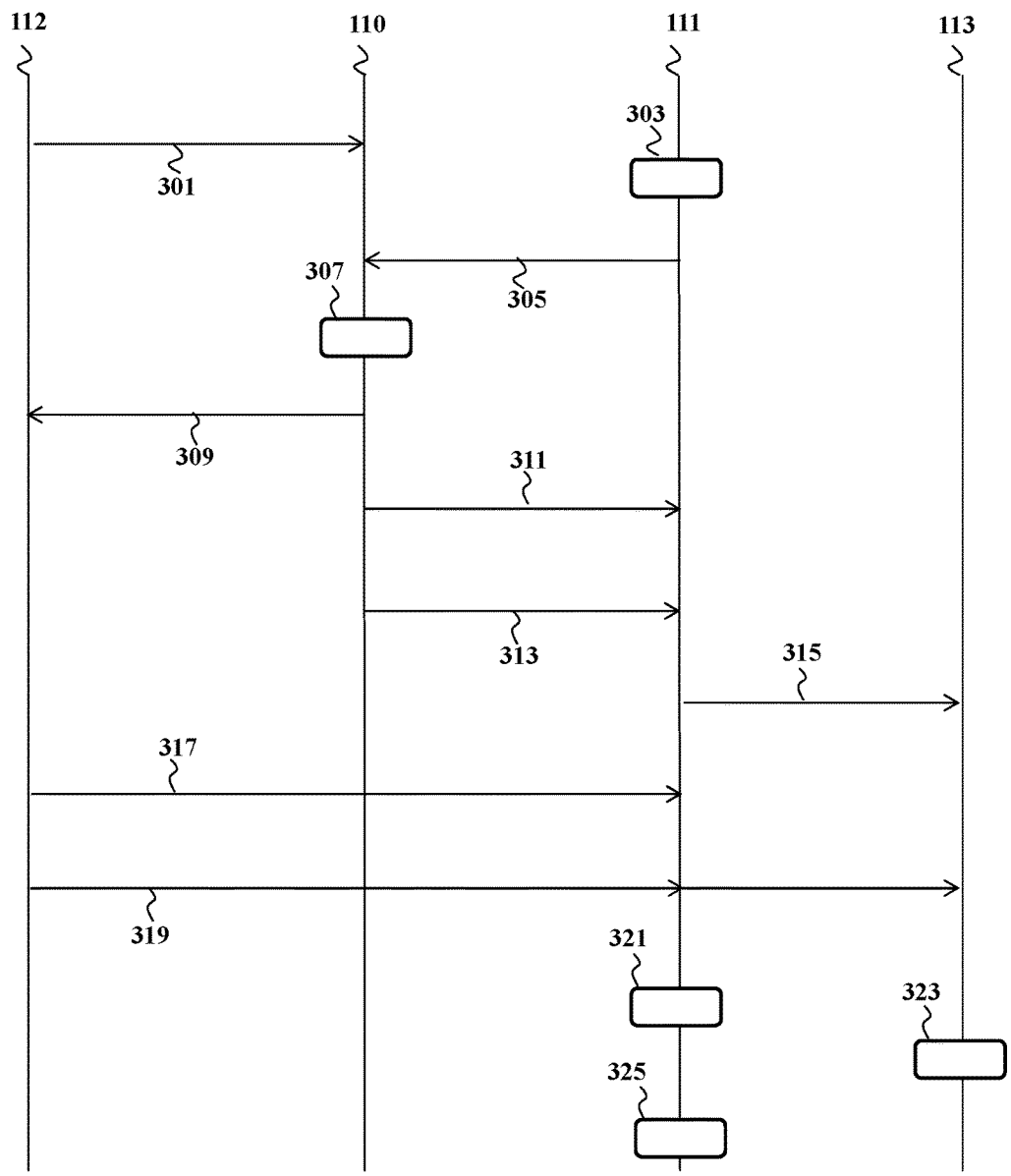
Figure 4:
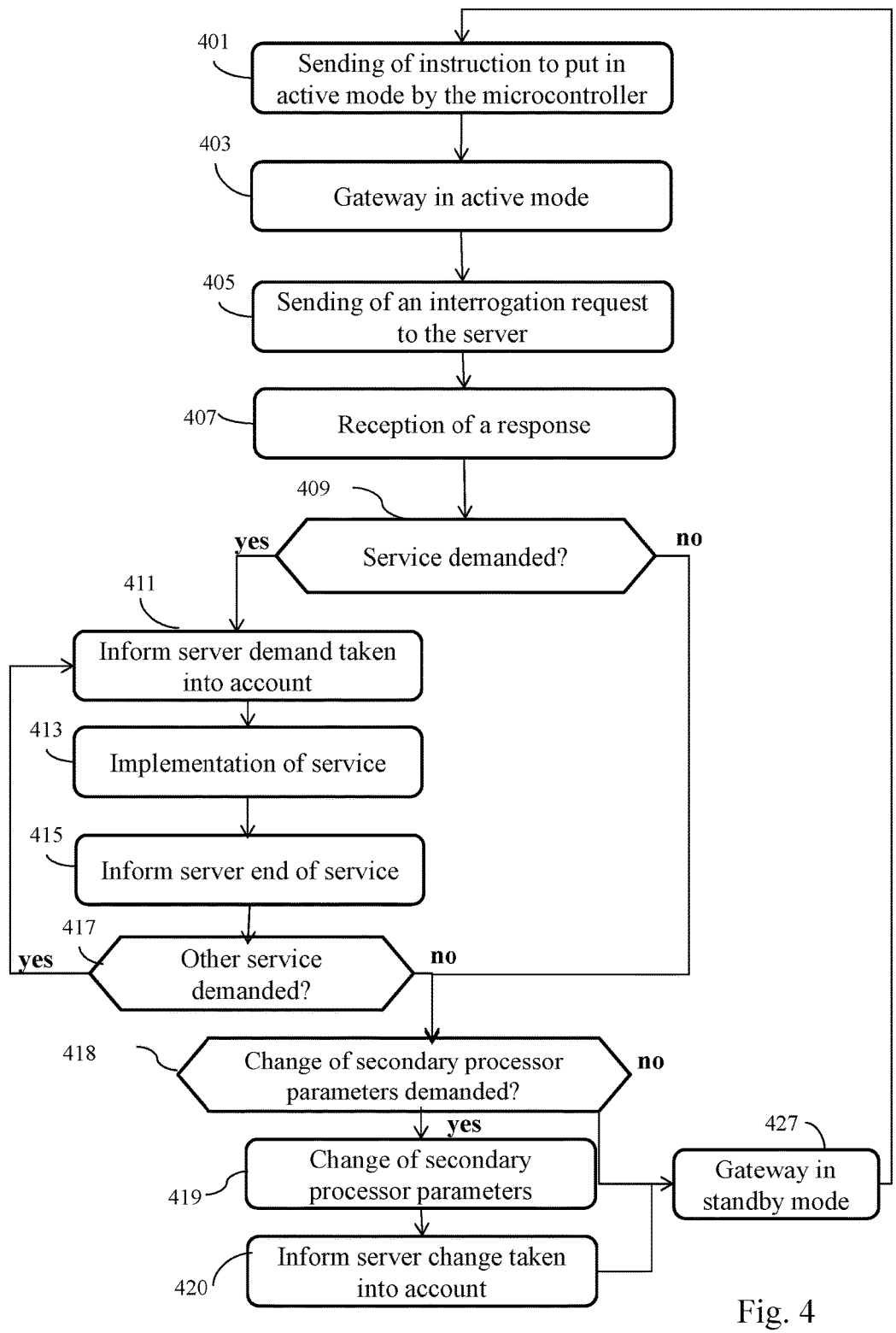
Figure 5:
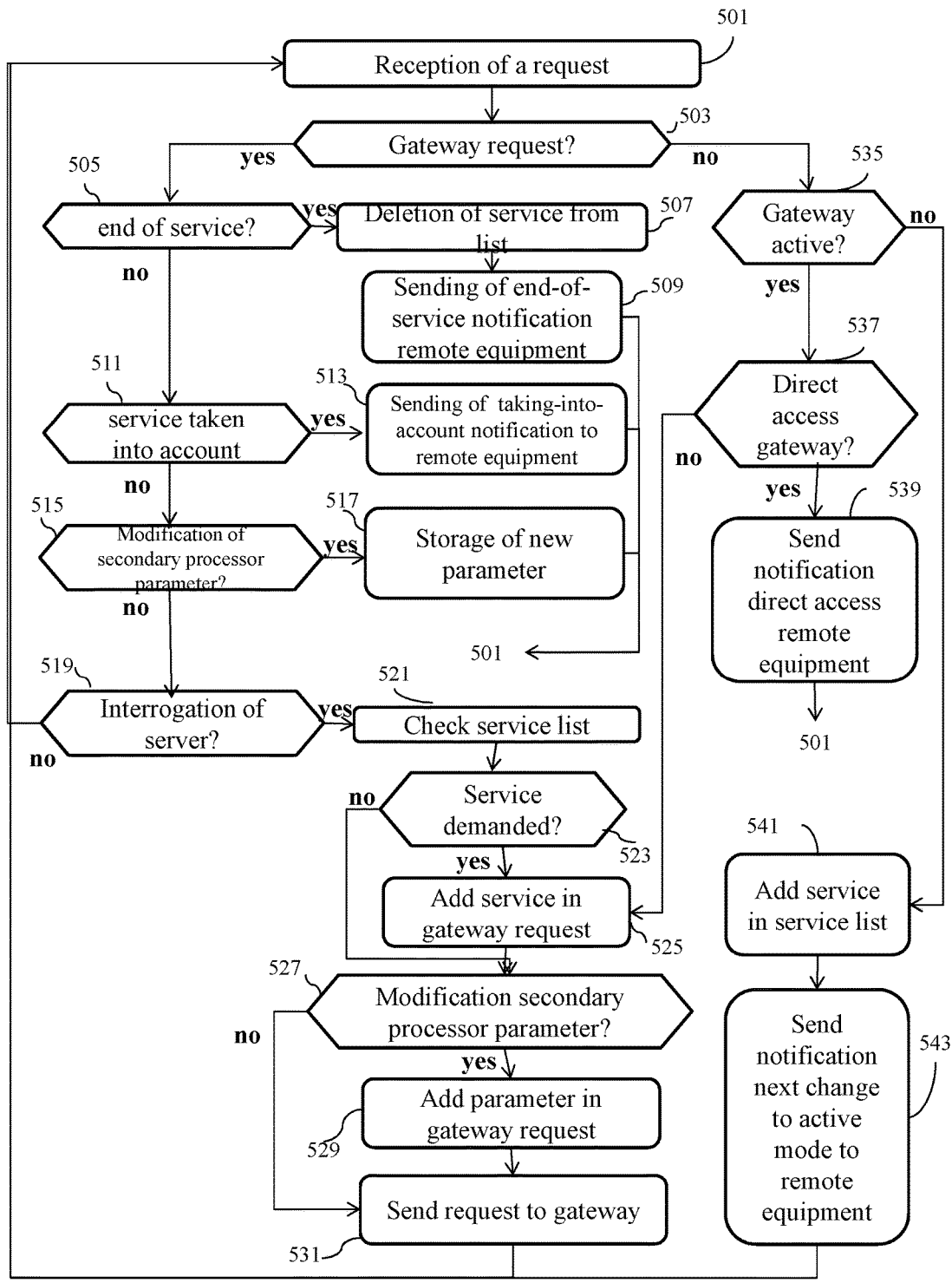
Figure 6:
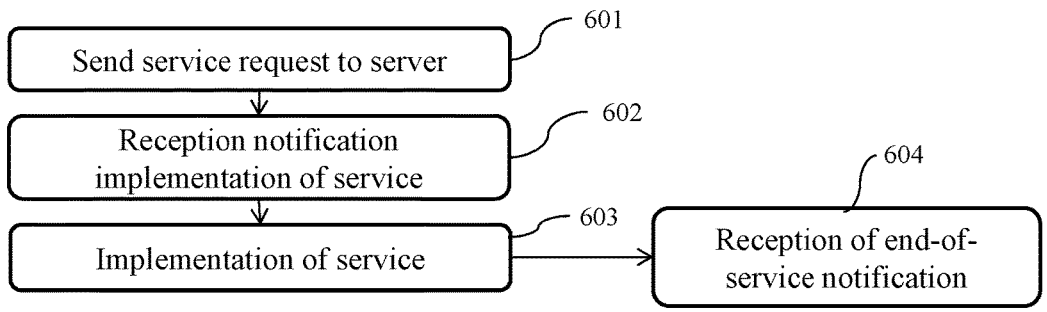
Figure 7:
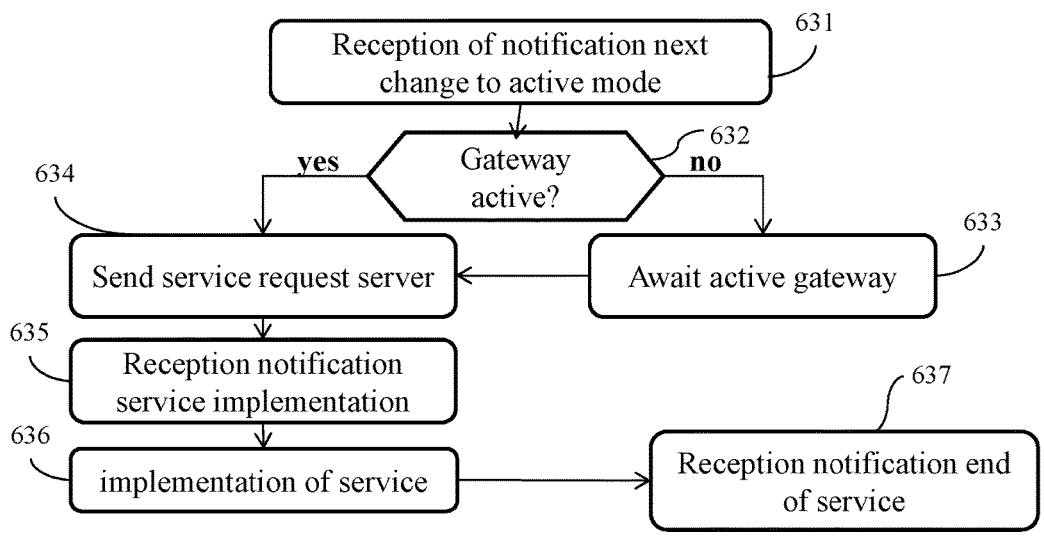
Figure 8:
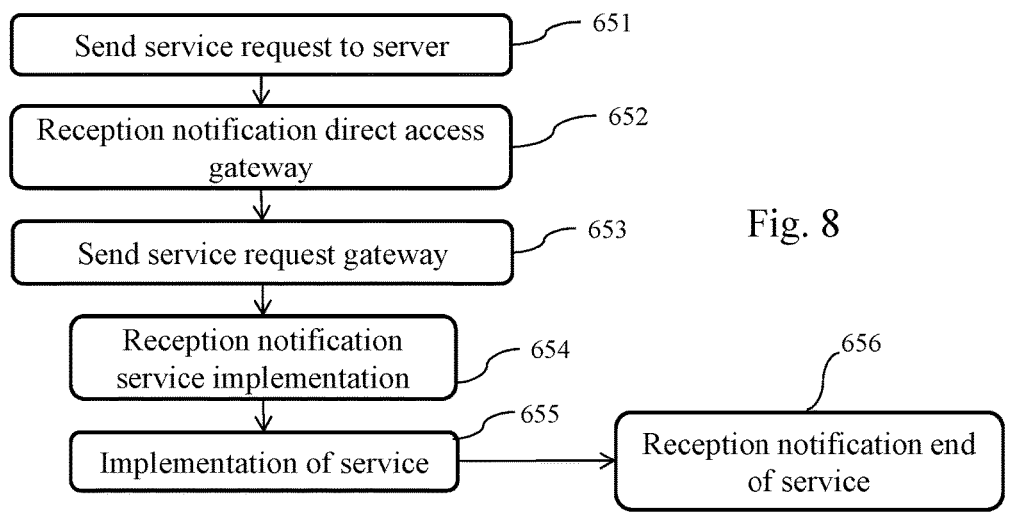
Figure 9:
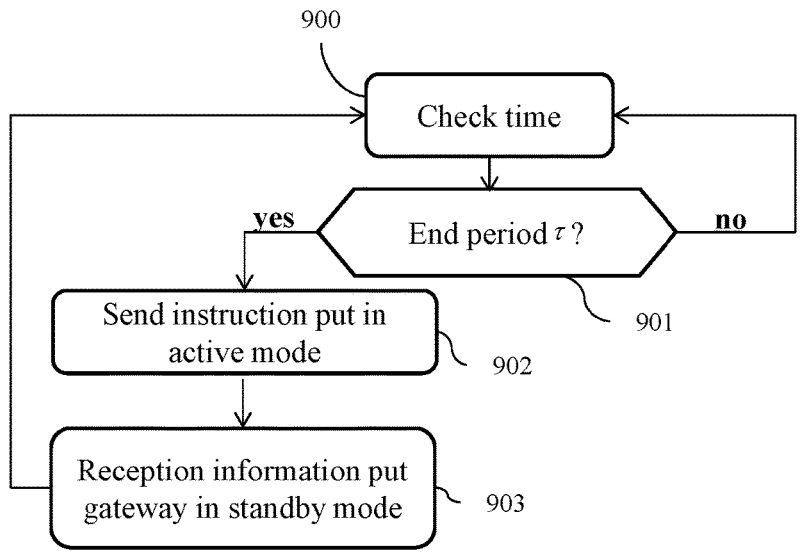
Figure 10:
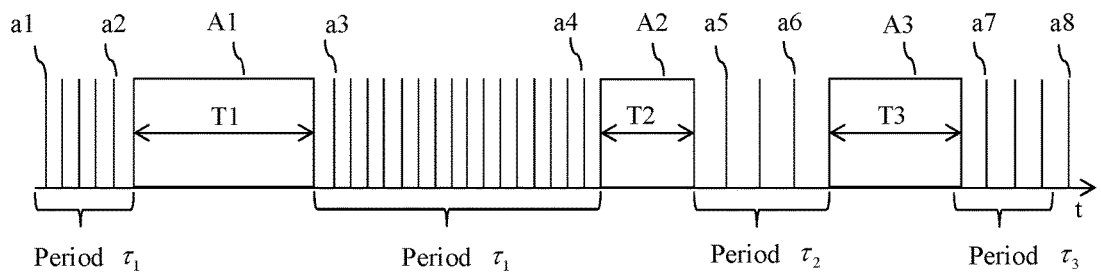

The features of the invention mentioned above, as well as others, will emerge more clearly from a reading of the following description of an example embodiment, said description being given in relation to the accompanying drawings, among which:

FIG. 1 depicts schematically a system able to implement the invention,

FIG. 2A depicts schematically a device able to use a server or remote equipment according to the present invention, FIG. 2B depicts schematically a device able to use a gateway according to the present invention, FIG. 3 depicts schematically an example of the use of an application for access to remote services using a gateway, in a system able to implement the invention such as the system described in relation to FIG. 1, FIG. 4 depicts schematically an algorithm, used by the gateway, for ensuring continuity of service, FIG. 5 depicts schematically an algorithm, used by the server, when a request is received, FIG. 6 illustrates schematically an algorithm used by the remote equipment when the latter transmits a service implementation demand to a server, FIG. 7 illustrates schematically an algorithm used by the remote equipment in the case of reception of a notification from the server indicating the imminent change of the residential gateway to active mode, FIG. 8 illustrates schematically an algorithm used by the remote equipment in the case of reception of a notification of direct access to the residential gateway, FIG. 9 depicts an example of an operating mode of a secondary processor of the residential gateway, and FIG. 10 illustrates schematically an example of behaviour of the residential behaviour over time.

The present invention is suitable for being implemented in a system comprising an interconnection device connecting a first network to a second network. In the context of the invention, the interconnection device functions in two modes: a standby mode in which the interconnection device has minimal energy consumption, but preventing any communication with the interconnection device on the one hand and between the two networks on the other hand; an active mode in which communications with the interconnection device and between the network are possible, but giving rise to greater energy consumption. The invention attempts to minimise the global energy consumption of the interconnection device by maximising the time spent in standby mode. However, in order to allow any service implementation demand requiring the use of the interconnection device to succeed, the device comprises a service-management server responsible for receiving the service implementation demands from remote equipment. The invention relates firstly to the demands relating to a service that is to be implemented by the interconnection device, and secondly the service implementation demands emanating from the remote equipment connected to the first network, but the use of which must be done on equipment connected to the second network. In the context of the invention, the management server is interrogated regularly by the interconnection device so that the interconnection device takes cognisance of the services, implementation of which is demanded. To do this, the interconnection device regularly goes into active mode, which enables the interconnection device to send an interrogation request to the service-management server. The device goes into standby mode again if, following the interrogation request, the service-management server replies that no service is demanded. On the other hand, if service implementation demands exist, the interconnection device implements these demands and goes into standby mode again only when the implementation of each service demanded ends.

The invention is detailed hereinafter, illustratively, in a particular embodiment in which the interconnection device is a residential gateway.

FIG. 1 depicts a system able to implement the invention. This system comprises a network 120, such as the Internet, to which an item of remote equipment 112 and a residential gateway 111 are connected. For reasons of simplification, the residential gateway 111 is simply referred to hereinafter as gateway 111.

The gateway 111 can offer a certain number of services such as a data storage service, but also be the interface between the Internet and a domestic LAN 115 comprising domestic equipment connected to the gateway 111. In order to maximise energy savings, the gateway 111 is usually in a standby mode ensuring minimal energy consumption. However, at instants determined by a secondary processor 1110 controlling the changes of the gateway 111 to active mode, the gateway 111 goes into an active mode. The change of the gateway 111 to active mode makes it possible to switch a certain number of components of the gateway 111 to active mode and in particular a main processor 1111 managing the use of services by the gateway. The change to active mode in particular enables the gateway to check whether services are to be implemented and, where applicable, to implement these services.

The remote equipment 112 may be a computer or a mobile appliance, such as a tablet or smartphone. This remote equipment can be used by a user to make a service implementation demand using for example a graphical interface. The equipment 112 may also be a server managed by an Internet access provider who supplied the gateway 111 and used for example to update software loaded in the gateway 111.

The domestic equipment may offer various services such as for example a video recording service by means of a PVR 113 or a data storage service such as a network hard disk 114. These services require the use of the gateway 111 which, in all cases, must provide an Internet access service.

The system also comprises a service-management server 110. The service-management server 110 (which we call simply server hereinafter) is, among other things, responsible for connecting and managing service implementation demands that the user and/or Internet operator may make using the remote equipment 112.

The remote equipment 112, the server 110 and the gateway 111 are interconnected by the network 120, so that these items of equipment can communicate when they are in active mode, which is always the case with the server 110. The connections to the LAN may be cabled connections provided by Ethernet cables, or wireless, using for example Wi-Fi connections.

We shall see hereinafter that the remote equipment 112 may also communicate directly with the gateway 111 in some cases.

The communications between the remote equipment 112, the server 110 and the gateway 111 may use conventional protocols, such as the HTTP (hypertext transfer protocol) and SOAP (simple object access protocol) protocols, or an architecture of the REST (representational state transfer) type. The communications with the remote equipment 112 may use more specific protocols depending on the remote equipment 112 used. For example, in the case of a smartphone, the communications may take the form of texts (SMS) or emails. However, other protocols, such as proprietary protocols, may also be used.

FIG. 2A illustrates schematically an example of hardware architecture of a device 200 able to implement the server 110 or the remote equipment 112. The device 200 comprises, connected by a communication bus 210: a processor or CPU (central processing unit) 201; a random access memory RAM 202; a read-only memory ROM 203; a storage unit 204 or a storage medium reader, such as an SD (secure digital) card reader or a hard disk HDD (hard disk drive); at least one interface 205 makes it possible to exchange data with other equipment. The interface 205 enables the server 110 to exchange data with the remote equipment 112 and the gateway 111 using the network 120. The interface 205 enables the remote equipment 112 to exchange data with the server 110 and the gateway 111 also using the network 120.

The processor 201 is capable of executing instructions loaded in the RAM 202 from the ROM 203, from an external memory (not shown), from a storage medium or from the network 120. When the device 200 is powered up, the processor 201 is capable of reading instructions from the RAM 202 and executing them. These instructions form a computer program causing the implementation, by the processor 201, of all or some of the algorithm steps described hereinafter in relation to the server 110 or the remote equipment 112.

FIG. 2B illustrates schematically an example of hardware architecture of a device 250 able to implement the gateway 111. The device 250 comprises, connected by a communication bus 260: a main processor or CPU (central processing unit) corresponding to the main processor 1111 of FIG. 1; random access memory RAM 252; a read-only memory ROM 253; a storage unit 254 or a storage medium reader, such as an SD (secure digital) card reader or a hard disk HDD (hard disk drive); a set of interfaces 255 for exchanging data with other items of equipment. In the case of the gateway 111, the device 250 exchanges data with the equipment 113 and 114 connected to the LAN 115, or with the server 110 and the remote equipment 112 through the network 120. The device 250 also comprises a secondary processor corresponding to the secondary processor 1110 in FIG. 1, such as a microcontroller. The secondary processor 1110 provides the changes to active mode, and may also be in charge of changes of the gateway 111 to standby mode.

The secondary processor 1110 is continuously kept in active mode, whereas a plurality of components of the gateway 111 comprising the main processor 1111 are usually in a standby mode for reducing energy consumption. As we shall see later, in a particular embodiment, standby mode is obtained by cutting off the electrical supply to said plurality of components of the gateway 111. In a preferred embodiment, the cutting off of the electrical supply is controlled by the main processor 1111. In another embodiment, cutting off the electrical supply may also be controlled by the secondary processor 1110. The secondary processor 1110 controls the electrical resupply to said plurality of components of the gateway 111 in order to provide change of the gateway 111 to active mode. The secondary processor 1110 has adjustable parameters, the adjustment of which is controlled by the main processor 1111. Among the parameters that can be adjusted by the main processor 1111, a parameter $\tau$ makes it possible to determine instants when the gateway 1111 changes to active mode. $\tau$ may, for example, represent a period during which the gateway must remain in standby mode or a period of change to active mode. Hereinafter, for reasons of simplification, the parameter $\tau$ for determining the instants when the gateway 111 changes to active mode will be referred to as the control parameter $\tau$.

The main processor 1111 is capable of executing instructions loaded into the RAM 252 from the ROM 253, from an external memory (not shown), from a storage medium or from the network 120. When the device 250 is put in active mode, the main processor 1111 is capable of reading instructions from the RAM 252 and executing them. These instructions form a computer program causing the implementation, by the main processor 1111, of all or some of the algorithms and steps described hereinafter in relation to the gateway 111 with the reception of what relates to the secondary processor 1110. The secondary processor 1110 is also capable of executing instructions loaded into a RAM from a ROM, from an external memory (not shown), from a storage medium or from the network 120. When the device 250 is powered up, the secondary processor 1110 is capable of reading instructions from the RAM and executing them. These instructions form a computer program causing the implementation, by the secondary processor 1110, of all or some of the algorithms and steps described hereinafter in relation to the secondary processor 1110.

In a particular embodiment, the gateway 111 also has a physical interface (not shown) in the form of a switch or push button, enabling a user to manually put the gateway 111 in standby mode or active mode.

All or some of the algorithms and steps described hereinafter may thus be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit). Each module shown in FIGS. 4 to 9 described below may thus correspond to a software implementation or to a hardware implementation. This means that only some of said modules may be implemented in software form whereas the rest of said modules may be implemented in hardware form.

FIG. 3 shows an example of implementation of data exchanges in the context of an application for remote access to services used by the gateway 111 or by equipment of the LAN 115. In the context of this application, the user, by means of the remote equipment 112, makes a service implementation demand. This service implementation demand is sent to the server 110 by the remote equipment 112 in a step 301.

For its part, independently of the service implementation demand made by the remote equipment 112, the gateway 111 goes from standby mode to active mode in a step 303. The changes to active mode are controlled by the secondary processor 1110 of the gateway 111. The changes to active mode occur at given instants, these instants being parameterisable under the control of the server 110 and/or of the gateway 111. Following this change to active mode, the gateway 111 sends, during a step 305, an interrogation request to the server 110. The objective of this interrogation request is firstly to inform the server 110 of the change of the gateway 111 to active mode and secondly to interrogate the server 110 on the possible existence of service implementation demands. Following this interrogation request, the server 110 checks, during a step 307, in a list of service implementation demands, whether service implementations have been demanded.

In the example in FIG. 3, said list contains at least the service implementation demand received by the server 110 during step 301. In this case, the server 110, during a step 309, sends a notification to the remote equipment 112 indicating to it that the gateway 111 is available for implementing the service demanded. The server 110 next sends to the gateway 111, in a step 311, a demand to modify the control parameter τ. In a step 313, the server 110 sends to the gateway 111 a description of the service demanded, said service being intended to be implemented by the gateway.

In a variant embodiment of steps 311 and 313, the server 110 sends to the gateway 111 a single request comprising the demand to modify the control parameter τ and the description of the service demanded.

In another variant embodiment, the server 110 sends solely the description of the service demanded. In this case, the gateway 111 deduces, from the description of the service demanded, the control parameter τ to be applied to the secondary processor 1110. For example, the gateway 111 blocks the change to standby mode as long as the implementation of the service has not ended.

In a variant embodiment of step 313, the service demanded is intended to be implemented by an item of equipment in the LAN 115, such as the PVR 113 or the network hard disk 114. In this case the description of the service demanded is transmitted in a step 315 to the relevant equipment in the LAN 115. It should be noted that, even if the service demanded is intended to be implemented by an item of equipment in the LAN 115, in all cases the gateway 111 must implement a service of access to the LAN 115. Consequently the gateway 111 must remain in active mode as long as the service used by the equipment in the LAN 115 has not ended.

In a variant embodiment of step 309, the notification sent to the remote equipment 112 also contains information indicating to the remote equipment 112 that, for use of the service demanded, the remote equipment 112 must contact the gateway 111 directly. In this case, during a step 317, the remote equipment 112 sends directly to the gateway 111 a request to modify the control parameter τ and a description of the service demanded.

The notification sent to the remote equipment 112 may also indicate that, for use of the service demanded, the remote equipment 112 must contact an item of equipment in the LAN 115 directly. In this case, during a step 319, the remote equipment 112 sends directly to the gateway 111 a demand for modification of the control parameter τ and, to said equipment in the LAN 115, a description of the service demanded. In the case of direct uses, steps 311 and/or 313 are not implemented.

The obtaining of the description of the service, either by the gateway 111 or by the equipment in the LAN 115, is followed by the use of the service demanded during steps 321 and 323. The implementation of all the services demanded enables the gateway 111 to go into standby mode again.

As we saw during step 303 of FIG. 3, the gateway 111 goes into an active mode under the control of the secondary processor 1110. In a particular embodiment of the invention, the changes to active mode, making it possible to check with the server 110 the existence of service implementation demands, are made at regular intervals. The control parameter τ in this embodiment represents a period of change to active mode.

FIG. 10 gives an example of behaviour of the gateway 111 over the course of time. In FIG. 10, the gateway 111 changes alternately from active mode to standby mode. Two types of changes to active mode are depicted:

vertical bars ai (i ranging from 1 to 8) represent instants of change to active mode of short duration. These changes to active mode occur when no service implementation demand has been received by the server 110. In this case, after having interrogated the server 110 and having received a response indicating to it that no service implementation is demanded, the gateway 111 returns to standby mode;

blocks Ai (i ranging from 1 to 3) represent changes to active mode of long duration. These changes to active mode occur when at least one service implementation demand has been received by the server 110. In this case, the gateway 111 interrogates the server 110 and is informed that at least one service implementation is demanded. The gateway 111 then implements the service demanded. When a demanded service has ended, the gateway 111 goes to standby mode again.

The duration of a change to active mode therefore depends essentially on the existence of a service implementation demand and, in the case of a service implementation demand, the duration of use of the service demanded. In FIG. 10, the changes to active mode A1, A2 and A3 have separate respective durations T1, T2 and T3. The changes to active mode ai have a very short duration corresponding to the time of sending an interrogation request to the server 110, and to the time of receiving the response to this request. As can be seen in FIG. 10, the changes to active mode ai have a distinct period $\tau_i$ (or conversely a distinct frequency $1/\tau_i$). This is because the changes to active mode between a1 and a4 take place with a period $\tau_1$, the changes between a5 and a6 take place with a period $\tau_2$ and the changes between a7 and a8 take place with a period $\tau_3$, the periods $\tau_1$, $\tau_2$, and $\tau_3$ being distinct. During the first use of the gateway 111, a default parameterising fixes the value of the period of change of the gateway 111 into active mode. We shall see subsequently that the period of change to active mode can be adjusted by the server 110 or by the gateway 111.

FIGS. 4 to 8 depict more specifically steps for reducing the energy consumption of the gateway 111, implemented by the gateway 111 (FIG. 4), the server 110 (FIG. 5) and the remote equipment 112 (FIGS. 6 to 8). FIG. 9 depicts more specifically the functioning of the secondary processor 1110 of the gateway 111.

FIG. 4 shows the algorithm, used by the gateway 111, for reducing the energy consumption of the gateway.

In a step 401, the secondary processor 1110 sends an instruction to put into active mode the plurality of components put in standby mode on the gateway 111. Following this instruction, in a step 403, the non-active components of the gateway 111 go into active mode. When it emerges from standby mode, the gateway 111 interrogates the server 110 in order to determine whether service implementations have been demanded. To do this, in a step 405, the gateway 111 sends an interrogation request to the server 110. In response to this request, the gateway 111 receives a response in a step 407. The response may come either from the server 110 or from the remote equipment 112. The content of the response is checked by the gateway 111 during a step 409.

If the response contains at least one description of a service, the algorithm continues with steps 411, 413, 415 and 417. In this embodiment, each service implementation demand contained in the response is treated sequentially according to its order of appearance in said response. For each service implementation demand, the gateway 111 sends, in step 411, an acknowledgement request to the server 110 informing the server 110 that the gateway 111 is ready to implement said service. The gateway 111 next implements the service demanded during a step 413. When implementation of the service ends, the gateway 111, during a step 415, sends a request indicating the end of the service to the server 110. The gateway 111 checks the presence of other service implementation demands during a step 417. This check may take place according to the response previously received and/or according to at least one other intermediate request received during the implementation of the previous service. Such intermediate requests may come from the server 110 or from the remote equipment 112. If other service implementations are demanded, the gateway 111 reiterates step 411. Otherwise the gateway 111, during a step 418, checks whether a modification to the control parameter $\tau$ has been demanded.

The demands for modifying the control parameter $\tau$ may come from the server 110 or from the gateway 111, but can be implemented only when the gateway 111 is in active mode. The gateway 111 may fix the control parameter $\tau$ according to statistics that the gateway 111 obtains in the context of the services that the gateway 111 has implemented. For example, one statistic used may be the quantity of service implementations demanded at the time of each change to active mode. If the mean quantity of service implementation demands during changes to active mode exceeds a first predefined threshold, this may mean that the gateway 111 does not go into active mode sufficiently often. In this case, the gateway 111 reduces the period of changing to active mode by decreasing the value of the control parameter $\tau$. If the gateway 111 determines that the mean quantity of service implementation demands during changes to active mode is below a second predefined threshold, the gateway 111 can deduce from this that the changes to active mode take place too often. Consequently, in this case, the gateway 111 increases the period of change to active mode by increasing the value of the control parameter $\tau$. In a variant embodiment, the user can fix the value of the control parameter $\tau$ by using for this an item of equipment in the LAN 115, such as a computer with a graphical interface making it possible to control the gateway 111 via a web server used by the gateway 111. We shall see subsequently how the server 110 can fix a new value of the control parameter $\tau$. In another variant embodiment, the user can force the change of the gateway 111 to active mode by using the physical interface, e.g. switch or push button, of the gateway 111.

If a change to the control parameter $\tau$ is actually demanded, the value of the modified control parameter $\tau$ is stored by the gateway 111 in place of the current value of the control parameter $\tau$, during a step 419. The gateway 111 next sends a request to the server 110 in order to inform the server 110 of the change in value of the control parameter $\tau$ during a step 420. If no modification to the control parameter $\tau$ is demanded, the gateway 111 goes into standby mode during a step 427. More precisely, during step 427, the main processor 1111 modifies the value of the control parameter $\tau$ with the value of the control parameter $\tau$ previously stored. Following the modification to the control parameter $\tau$, the main processor 1111 causes said plurality of components of the gateway 111 to go into standby. In another embodiment, the secondary processor 1110 may also cause the gateway to go into standby mode instead of the main processor 1111.

Steps 411 to 417 show a process where the service implementation demands contained in the response transmitted by the server 110 are treated sequentially in the order of appearance thereof in said response. In a variant embodiment, these service implementation demands are treated in parallel.

If, during step 409, the gateway 111 finds that no service implementation demand is mentioned in the response transmitted by the server 110, the gateway 111 checks that no change in control parameter $\tau$ has been requested. For this purpose, the gateway 111 continues the algorithm in FIG. 4 directly with steps 418, 419 and 420 already described. The gateway 111 then goes into standby mode at step 427.

As seen above, the secondary processor 1110 is responsible for regularly putting the gateway in active mode. An example of functioning of the secondary processor 1110 is detailed in FIG. 9.

In a step 900, the secondary processor 1110 checks, with a high frequency, higher than the frequency of going into active mode $1/\tau$, the value of an item of time information (or clock value) given by a clock internal to the gateway 111. This internal clock indicates a clock value representing the time elapsed since the last putting into active mode. The clock value is reset to zero at each change to active mode. The clock value is next compared with the control parameter $\tau$.

If, during a step 901, the internal clock indicates a clock value lower than the value of the control parameter $\tau$, the secondary processor 1110 returns to step 900. On the other hand, if the internal clock indicates a clock value greater than or equal to the value of the control parameter $\tau$, the secondary processor 1110 sends, in a step 902, an instruction to said plurality of components of the gateway 111 to go into active mode. This instruction to go into active mode can take place in the form of an electrical resupply to said plurality of components.

Following the change to active mode, the secondary processor 1110 goes into an operating mode in which it can no longer send an instruction to go into active mode to said plurality of components. In this embodiment, the change of the secondary processor 1110 to this operating mode does not require the action of the main processor 1111.

In a step 903, the secondary processor 1110 awaits an instruction from the main processor 1111 indicating to it that said plurality of components have gone into standby mode. In a preferred embodiment, the putting in standby mode is done under the control of the main processor 1111. The reception of this instruction by the secondary processor 1110 causes return to step 900. In an alternative embodiment of step 903, after reception of the instruction from the main processor 1111, the secondary processor 1110 puts the plurality of components in standby mode. The putting in standby mode causes return to step 900.

The server 110 makes it possible to mitigate the periods of inaccessibility of the gateway 111 due to the gateway 111 going into standby mode. An algorithm used by the server 110 on reception of requests is described in relation to FIG. 5.

During a step 501, the server 110 receives a request. Since this request may come from the gateway 111 or from the remote equipment 112, during a step 503, the server 110 determines the origin of the request. If the request comes from the gateway 111, the server 110 determines the type of request. The determination of the type of request commences with a step 505, during which the server 110 determines whether the request is an end-of-service request. If such is the case, the request makes it possible to identify which service has ended. During a step 507, the server 110 deletes said service from the list of service implementation demands managed by the server. The end of the service is next notified, during a step 509, to the remote equipment 112 by sending an end-of-service notification. In a variant embodiment, the end-of-service request is sent by the remote equipment 112 and notified to the gateway 111. The sending of the notification is in all cases followed by the awaiting of a new request. The reception of a new request causes return to step 501.

If the request received is not an end-of-service request, the server 110 determines, during a step 511, whether this request is a request to take a service into account. If such is the case, the request received by the server 110 makes it possible to identify the service taken into account by the gateway 111. The server 110 next sends, in a step 513, a notification to the remote equipment 112 indicating that the gateway 111 is ready to implement the service that has been taken into account. Implementation of the service can then begin on the gateway 111 (and on an item of equipment in the LAN 115 if necessary) and the remote equipment 112. The sending of the notification is in all cases followed by the awaiting of a new request. Reception of a new request causes return to step 501.

If the request received is not a request to take into account a service, the server 110 determines, during a step 515, whether this request is a request to notify a modification of the control parameter $\tau$. If such is the case, the server 110 stores the modified value of the control parameter $\tau$ in a step 517. The server 110 can use the control parameter $\tau$ thus stored in order to inform the remote equipment 112 of the frequency of change of the gateway 111 to active mode, or of the next change of the gateway 111 to active mode. The exchange of this information between the gateway 111 and the server 110 is particularly useful when the gateway 111 alone decides on the modification to the control parameter $\tau$. The storage of the parameter $\tau$ is followed by the awaiting of a new request by the server 110. Reception of a new request causes return to step 501.

If the request is not a request to notify a modification of the control parameter $\tau$ by the gateway 111, the server 110, during a step 519, determines whether the request is a request to interrogate the server 110. If such is the case, the server 110 continues with the checking of the list of service implementation demands during a step 521. During a following step 523, the server 110 checks the content of said list and constructs a request intended for the remote equipment 112. Said request is initially empty. If the list contains service implementation demands, the server 110 inserts, in said request, in a step 525, the description of the demanded service implementations contained in the list.

Following step 523 or step 525, the server 110, during a step 527, checks whether modifications to the control parameter $\tau$ are to be made. The modifications to the control parameter $\tau$ may have several origins. The server 110 may manage statistics on the service implementation demand. For example, if the server 110 frequently receives service implementation demands, e.g. with a frequency greater than a third threshold, the server 110 may increase the frequency at which the gateway 111 goes into active mode by decreasing the value of the control parameter $\tau$. If on the other hand the service implementation demands are infrequent, for example with a frequency less than a fourth threshold, the server 110 may increase the value of the control parameter $\tau$ in order to reduce the frequency at which the gateway goes into standby mode. In a variant embodiment, the user fixes the value of the control parameter $\tau$ according to his requirements, using the remote equipment 112. In this case, the remote equipment 112 sends a specific request to the server 110 containing a new value of the control parameter $\tau$.

If the value of the control parameter $\tau$ is to be modified, a new value of the control parameter $\tau$ is inserted in the response intended for the gateway 111 and created during step 523. Whatever its content, the response created during step 523 is sent to the gateway 111. As described above in the description of the functioning of the gateway 111 in relation to FIG. 4, the gateway 111 adapts its functioning to the content of the request. Following this sending, the server 110 awaits the reception of a new request. The reception of a new request causes return to step 501.

If during step 519 the type of request is not recognised, the server 110 ignores this request and awaits the reception of a new request. Reception of a new request causes return to step 501.

If the request received is not a request coming from the gateway 111, the server 110 deduces from this, at step 501, that this request is a service implementation demand coming from the remote equipment 112. During a step 535, the server 110 determines whether the gateway 111 is in active mode. The server 110 can deduce that the gateway 111 is in active mode if, following the reception of a request to take into account a service for a given service implementation demand, no end-of-service request has been received. If the gateway 111 is in active mode, the server 110, during a step 537, determines whether the remote equipment 112 can access the gateway 111 directly. The decision to enable the remote equipment 112 to access the gateway 111 directly may depend on the state of the gateway 111. If the gateway 111 is in active mode, the remote equipment 112 is systematically enabled to access the gateway 111 directly. The decision to enable the remote equipment 112 to access the gateway 111 directly may also depend on the type of service demanded. In an alternative embodiment, the decision to enable the remote equipment 112 to access the gateway 111 directly may take into account the result of an analysis of the traffic on the network links leading to the gateway 111, such as for example an analysis of the deep packet inspection type. Analysis of the traffic may be implemented by the gateway 111 or by an independent item of equipment on the network 120. The result of the analysis may next be transmitted to the server 110.

If the server 110 enables the remote equipment 112 to access the gateway directly, the server 110 sends a direct-access enable notification to the remote equipment 112, during step 539. Following this notification, the server 110 awaits the reception of a new request. Reception of a new request causes return to step 501.

If the server 110 does not enable the remote equipment 112 to access the gateway 111 directly and a request intended for the gateway 111 is currently being constructed, the service implementation demand is added to said request in step 525. If no request is currently being constructed, the service implementation demand is added to the list of service implementation demands, during a step 541 (situation not shown in FIG. 5).

If during step 525 the server 110 determines that the gateway 111 is in standby mode, the server 110 adds the service implementation demand contained in the request to the list of service implementation demands during step 541.

In a variant embodiment of step 541, the server 110 is capable of interpreting the service implementation demand contained in the request. The interpretation may lead the server 110 to extract representative parameters for the service demanded. For example, if the service demanded is a video recording service, the server 110 can interpret the request and extract representative parameters therefrom such as the recording television channel, a recording start date and a recording end date. These are then the representative parameters resulting from this interpretation that are inserted in the list of service implementation demands. In this case, the service implementation demand contained in the service implementation demand request is not copied as such, during step 525, in the response intended for the gateway 111. This is because, in this case, the server 110 inserts, in the response intended for the gateway 111, the parameters obtained during the interpretation of the service implementation demand stored in the list of service implementation demands.

In another variant embodiment of step 541, the interpretation of the service implementation demand contained in the request may lead the server 110 to fix a parameter representing a date of sending of the service implementation demand. This is because, if a service demanded must start at a precise start date sufficiently remote in time for a plurality of successive changes of the gateway 111 to active mode to be able to occur, it is not necessary to send a request to the gateway 111 for this service when the gateway 111 next goes into active mode. Such a service implementation demand is then associated by the server 110 with a date of sending to the gateway 111 before storage in the list of service implementation demands. The date of sending to the gateway 111 is fixed by taking into account a start date obtained by interpreting the service implementation demand. In this case, during step 523, only the service implementation demands in the list that are not associated with the date, or the sending date of which has passed, are considered. This implementation is particularly suitable for service demands for video recording on a PVR, where the start of the recording is to take place at a precise date distant in time, not requiring the immediate putting of the gateway 111 in active mode.

In another variant embodiment of step 541, the interpretation of the service implementation demand contained in the request may lead the server 110 to fix a parameter representing a period of activation of a service. This is because a service may be periodic and must be implemented at regular intervals. In this case, the server 110 associates the service implementation demand with an activation period. Periodic services may be managed in a plurality of ways by the server 110.

In a first embodiment, when a service implementation demand corresponding to a periodic service is received by the server 110, the server 110 transmits to the gateway 111, during step 531, a new value of the control parameter $\tau$ equal to the value of the period of the service demanded. If a plurality of periodic services are demanded, each service having a different period, the server 110 transmits to the gateway 111 a new value of the control parameter $\tau$ equal to the highest common factor of the periods of the services demanded.

In a second embodiment, a periodic service implementation demand is considered by the server, during step 523, only when the time elapsed since the last activation of the service approaches the value of the activation period.

The first and second embodiments are particularly suitable when the service consists of enabling a user, or an operator of the network 120, to regularly transfer information from the gateway 111, or from a sensor connected to the gateway 111, such as for example a temperature and/or atmospheric pressure and/or humidity level sensor.

Optionally, during a step 543 following step 541, the server 110 estimates the date of the next occasion when the gateway 111 will go into active mode, relying on the value of the control parameter $\tau$. The date when the gateway 111 will next go into active mode can then be sent to the remote equipment 112 in the form of a notification. Following step 541 and/or step 543, the server 110 awaits the reception of a new request. Reception of a new request causes return to step 501.

FIG. 6 illustrates schematically an algorithm used by the remote equipment 112 for making a service implementation demand to the server 110. It should be noted that the sending of a service implementation demand request to the server 110 can follow the failure of a service implementation demand made directly to the gateway 111.

In a step 601, the remote equipment 112 sends to the server 110 a service implementation demand request. After a period of greater or lesser length, depending on the going of the gateway 111 into active mode, the remote equipment 112 receives, during a step 602, a notification indicating that the gateway 111 is available for implementing the service. The remote equipment 112 next uses the service conjointly with the gateway 111 during a step 603. The end of the service is notified by the server 110 to the remote equipment 112, during a step 604.

FIG. 7 illustrates schematically an algorithm used by the remote equipment 112 in the event of the reception of a notification from the server 110 indicating the imminent change of the gateway 111 to active mode.

The algorithm in FIG. 7 begins with the reception, by the remote equipment 112, of the notification in a step 631. In a following step 632, the remote equipment 112 determines whether the gateway 111 is in active mode. If the gateway 111 is not in active mode, in a step 633, the remote equipment 112 awaits the next change of the gateway 111 to active mode. When the gateway 111 has gone into active mode, the remote equipment 112 sends a service implementation demand request to the server 110 in a step 634. The remote equipment 112 then implements steps 635, 636 and 637, which are respectively in all regards identical to steps 602, 603 and 604 of FIG. 6.

FIG. 8 illustrates schematically an algorithm used by the remote equipment 112 in the case of reception by the remote equipment 112 of a notification of direct access to the gateway 111. Following the sending to the server 110, by the remote equipment 112, of a service implementation demand request during a step 651, the server 110 responds, in a step 652, with a notification indicating to the remote equipment 112 that the remote equipment 112 can access the gateway 111 directly. The remote equipment 112 next sends a service implementation demand request to the gateway 111 in a step 653. In a following step 654, the server 110 receives a service implementation notification coming from the gateway 111. The remote equipment 112 then implements the service conjointly with the gateway 111 (and an item of equipment in the LAN 115 if necessary) during a step 655. The end of the service is notified by the gateway 111 to the remote equipment 112 during a step 656.

The invention claimed is:

1. A method used by a device for interconnecting a first communication network and a second communication network, said interconnection device comprising a plurality of components functioning in an active mode or a standby mode, wherein said interconnection device performs the following steps:

changing to active mode the plurality of components under control of a secondary processor, the secondary processor being a component of the interconnection device continuously in active mode and controlling changes to active mode of the plurality of components at given instants, the given instants being controlled by the secondary processor using a control parameter fixed by the interconnection device when the plurality of components are in active mode, where the control parameter is a function of statistics of a quantity of services implemented by the interconnection device, a change to standby mode being controlled by the interconnection device following an end of use of a service, following the change of the plurality of components to active mode, sending an interrogation request to a service-management server connected to the first communication network in order to check the existence of service demands, receiving a response to the interrogation request, and changing the plurality of components to standby mode by means of the secondary processor at an instant dependent on the response received.

2. The method according to claim 1, wherein, when said response contains information representing a service implementation demand, the interconnection device implements a service depending on a service demanded in the service implementation demand.

3. The method according to claim 2, wherein the service demanded in the service implementation demand is intended to be implemented by an item of equipment connected to the second network, the service dependent on the service demanded in the service implementation demand being a service of access to the second network.

4. The method according to claim 2, wherein the service implementation demand is first received by the service management server from a remote item of equipment connected to the first communication network.

5. The method according to claim 1, wherein the control parameter represents a period when the plurality of components go into active mode.

6. A method implemented by a service-management server connected to a first communication network, the first communication network being connected to a second communication network by an interconnection device, wherein, in the event of reception of an interrogation request coming from the interconnection device, the service-management server performs the following steps:

checking the presence of a service implementation demand emanating from a remote item of equipment in a list of service implementation demands, each service implementation demand requesting execution of a service by the interconnection device, if a service implementation demand is present, sending a response to the interconnection device containing information representing the service implementation demand received, said interrogation requests having been sent by the interconnection device at a given period wherein the interconnection device was functioning in active mode, the each transition from standby mode to active mode being controlled by a secondary processor of the interconnection device, and the service-management server controlling the given period when the interconnection device goes into active mode by determining modification information intended to modify a control parameter of the secondary processor of the interconnection device allowing control of said period and by sending said modification information to the interconnection device to modify said control parameter, said modification information being determined by the service-management server as a function of statistics on a frequency of reception of service implementation demands by the service-management server.

7. The method according to claim 6, wherein the service-management server interprets each service implementation demand in order to determine a representative parameter for the service implementation demand and the representative parameter determined is saved in the list of service implementation demands.

8. The method according to claim 6, wherein, in the event of the reception of a service implementation demand from a remote item of equipment connected to the first network, the service-management server determines whether the interconnection device is in active mode or in standby mode and, if the interconnection device is in active mode, the service-management server enables the remote equipment to contact the interconnection device directly.

9. A service-management server connected to a first communication network, the first communication network being connected to a second communication network by an interconnection device, wherein the device is configured for:

receiving interrogation requests coming from the interconnection device, said interrogation requests having been sent at determined periods corresponding to changes of the interconnection device from standby mode to active mode controlled by a secondary processor of the interconnection device, the service-management server controlling the period when the interconnection device goes into active mode by determining modification information intended to modify a control parameter of the secondary processor of the interconnection device to allow control of said period and by sending said modification information to the interconnection device to modify said control parameter, said modification information being determined by the service-management server as a function of statistics on a frequency of reception of service implementation demands by the service-management server; and checking, in the case of reception of an interrogation request, the presence of a service implementation demand coming from remote equipment in a list of service implementation demands, and sending a response to the interconnection device containing information representing a service implementation demand received if a service implementation demand is present.

10. An interconnection device for interconnecting a first network and a second network, comprising a plurality of components functioning in an active mode or a standby mode, wherein the device comprises:

a secondary processor, continuously in active mode, configured to control changes of the plurality of components to active mode at given instants, the given instants being controlled by the secondary processor using a control parameter fixed by the interconnection device when the plurality of components are in active mode as a function of statistics on a quantity of services implemented by the interconnection device;

and the device is configured for sending, following a change of the plurality of components to active mode, an interrogation request to a service-management server, receiving a response to the interrogation request, and determining an instant of changing to standby mode according to the response received.

11. A non transitory information storage medium storing a computer program comprising program code instructions which can be loaded in a programmable device to cause the programmable device to implement the method according to claim 1 when the program code instructions are run by the programmable device.

12. A non transitory information storage medium storing a computer program comprising program code instructions which can be loaded in a programmable device to cause the programmable device to implement the method according to claim 6 when the program code instructions are run by the programmable device.

* * * * *